(12) United States Patent
Smadi et al.

(10) Patent No.: US 9,497,506 B2
(45) Date of Patent: Nov. 15, 2016

(54) INPUT LAG ESTIMATION FOR WI-FI DISPLAY SINKS

(71) Applicant: RESEARCH IN MOTION LIMITED, Waterloo (CA)

(72) Inventors: Mohammed Nawaf Smadi, Ancaster (CA); Vytautas Robertas Kezys, Ancaster (CA); Jean-Philippe Paul Cormier, Ottawa (CA)

(73) Assignee: BLACKBERRY LIMITED, Waterloo, Ontario (CA)

( * ) Notice: Subject to any disclaimer, the term of this patent is extended or adjusted under 35 U.S.C. 154(b) by 288 days.

(21) Appl. No.: 13/886,426

(22) Filed: May 3, 2013

(65) Prior Publication Data
US 2014/0331263 A1    Nov. 6, 2014

(51) Int. Cl.
| | |
|---|---|
| *H04N 21/442* | (2011.01) |
| *H04N 21/41* | (2011.01) |
| *H04N 21/4363* | (2011.01) |
| *H04N 21/4402* | (2011.01) |
| *H04N 21/45* | (2011.01) |

(52) U.S. Cl.
CPC .... *H04N 21/44231* (2013.01); *H04N 21/4126* (2013.01); *H04N 21/43637* (2013.01); *H04N 21/4402* (2013.01); *H04N 21/4516* (2013.01)

(58) Field of Classification Search
CPC .... H04N 7/106; H04N 21/442; H04N 21/41; H04N 21/44; H04N 21/462
USPC .......................................................... 725/81
See application file for complete search history.

(56) References Cited

U.S. PATENT DOCUMENTS

| | | | |
|---|---|---|---|
| 2005/0210515 A1* | 9/2005 | Roh ....................... | H04N 7/163 725/81 |
| 2011/0018959 A1 | 1/2011 | Friel et al. | |

OTHER PUBLICATIONS

Corbin: "Low input lag HDTV/Monitor database", GTPlanet; Apr. 7, 2013, XP002712977, Retrieved from the Internet: URL:http://www.gtplanet.net/forum/showthread.php?t=280211 [retrieved on Sep. 16, 2013].
Corresponding European Patent Application No. 13166511.9 Partial Search Report dated Sep. 27, 2013.
Adeel soomro: "The Lag Tester: A New Standard"~http://www.displaylag.com, Jan. 25, 2013~XP002717266, Retrieved from the Internet: URL:http://www.displaylag.com/the-lag-tester-a-new-standard/ [retrieved on Dec. 2, 2013].
Corresponding European Patent Application No. 13166511.9 Search Report dated Dec. 16, 2013.
Dale North: "This HDTV Monitor Lag Database could be handy", Feb. 15, 2013, p. 1, XP055271264, Retrieved from the Internet: URL:http://www.destructoid.com/this-hdtv-monitor-lag-database-could-behandy-245068.phtml [retrieved on May 9, 2016].
Adeel Soomro: "What is Input Lag: The Breakdown 1 DisplayLag", Display Lag, Feb. 3, 2013 (Feb. 3, 2013), XP055271243, Retrieved from the Internet: URL:http://www.displaylag.com/what-is-input-lag-the-breakdown/ [retrieved on May 9, 2016].
Communication pursuant to Article 94(3) EPC dated May 17, 2016 for European Patent Application No. 13166511.9.

* cited by examiner

*Primary Examiner* — Paulos M Natnael
*Assistant Examiner* — Sihar Karwan
(74) *Attorney, Agent, or Firm* — Perry + Currier, Inc.

(57) ABSTRACT

A source device comprising a processor and a Wi-Fi module for communicating with a sink device to stream audio/video data. The processor is configured to one of either A) identify manufacturer and model of the sink device, retrieve input lag data for the sink device from a database indexed by manufacturer and model of the sink device, and optimize encoding of the audio/video data by adjusting transmission parameters based on the input lag data; or B) generate a signal, detect the signal reproduced at the sink device, measure the input lag between generation of the signal and reproduction thereof at the sink device, and optimize encoding of the audio/video data by adjusting transmission parameters based on the input lag data.

14 Claims, 5 Drawing Sheets

INPUT LAG ESTIMATION FOR WI-FI DISPLAY SINKS

FIELD

This specification relates generally to mobile devices and display systems, and more particularly to a method and apparatus for estimating input lag in Wi-Fi display systems.

BACKGROUND

The sustained popularity of mobile handheld devices has contributed to a proliferation of wireless networks and hotspots for accessing and viewing online multimedia content. This has led, in turn, to development of technology for wirelessly streaming content such as online videos, movies, games and web pages from mobile devices to external high definition displays.

Several peer-to-peer wireless technologies have been developed for securely and wirelessly sending video and audio from a source device to a remote display device. Examples of proprietary technologies include WiDi developed by Intel Corporation, and AirPlay developed by Apple Inc. In an effort to provide an open standard, the Wi-Fi Alliance (WFA) has developed the Miracast™ standard, which uses Wi-Fi Direct™ interconnect supported devices without the need for a wireless access point.

According to the Miracast™ specification, when two devices connect with each other directly, one assumes the role of the source (transmitting device) and the other becomes a sink (the device receiving and rendering the content to the user). In operation, a real-time digital video screen capture from the source device is streamed via a WLAN (wireless local area network) for display via the sink device. Since the video content in the display buffer of the source device is in raw format (e.g. YUV colour space), the content must be compressed by an encoder (e.g. x264 encoder), taking into account the display device capabilities and network conditions in order to optimize transmission over the Wi-Fi interface. The display device (sink) receives the content, decodes it, and then displays the content. However, the compression introduced by encoding comes at the expense of image quality and/or latency. In order to maintain a satisfactory end-user experience, a minimum level of video quality must be provided. This requires adjusting the compression and latency parameters of the encoder. For example, in an x264 encoder the output bit rate can be constrained using VBV (video buffer verifier) encoding, and encoder latency can be adjusted by varying the number of frames held by the x264 internal buffer. The required level of compression is dictated by the type and quality of the WLAN link, including supported rates and network conditions. For example, a 2×2 spatial multiplexing WLAN link provides an over-the-air (OTA) throughput of 130 Mbps whereas a 1×1 WLAN link provides only 65 Mbps. The latency requirement of the encoder is an integrant of the end-to-end latency (or glass-to-glass latency, which captures the time elapsed between the first pixel appearing on the source device and appearing on the sink device). The latency requirement dictates the class of supported applications over a given link. For example, a 100 msec end-to-end latency budget may be sufficient to support a web browsing application whereas heavy interactive gaming may require a less than 50 msec end-to-end budget.

A significant portion of the end-to-end latency budget may be consumed by the input lag of the sink device, which is defined as the difference between the time that a signal is input into the sink device and the time that it is shown by the display. This input lag time has been measured as high as 68 ms or the equivalent of 3-4 frames on a 60 Hz display. The greater the input lag of the sink device, the less compression that can be provided to the signal. Since the input lag is often unknown, it is customary to assume a conservative input lag contribution to the end-to-end latency when choosing the compression level during source encoding.

The WFA maintains a current list of Miracast™ Certified devices for which the input lag is known. Therefore, in some implementations the input lag is stored as part of the extended display identification data message (display_edid), and can be used in calculating the level of compression to be applied at the source device for a particular application. However, there are many implementations where this information is not known.

It is therefore desirable to provide a solution to the problem of estimating input lag in applications where the input lag is not known.

BRIEF DESCRIPTIONS OF THE DRAWINGS

For a better understanding of the various implementations described herein and to show more clearly how they may be carried into effect, reference will now be made, by way of example only, to the accompanying drawings in which.

DETAILED DESCRIPTION

In this specification, elements may be described as "configured to" perform one or more functions or "configured for" such functions. In general, an element that is configured to perform or configured for performing a function comprises structure for performing the function, or is enabled to perform the function, or is suitable for performing the function, or is adapted to perform the function, or is operable to perform the function, or is otherwise capable of performing the function.

In this specification, elements may be described as configured to "capture" an image. In general, an element that is configured to capture an image is configured to acquire an electronic image, or obtain an electronic image, and the like.

An aspect of the specification provides a source device comprising, a processor and a Wi-Fi module for communicating with a sink device to stream audio/video data thereto. The processor may be configured to one of either identify manufacturer and model of the sink device, retrieve input lag data for the sink device from a database indexed by manufacturer and model of the sink device, and optimize encoding of the audio/video data by adjusting transmission parameters based on the input lag data; or generate a signal, detect the signal reproduced at the sink device, measure the input lag between generation of the signal and reproduction thereof at the sink device, and optimize encoding of the audio/video data by adjusting transmission parameters based on the input lag data.

The processor can be further configured to identify the manufacturer and model of the sink device by reading extended display identification data from the sink device.

The processor can be further configured to identify the manufacturer and model of the sink device by receiving data input thereof via an input device.

The source device can further include a memory for storing the database.

The source device can further include a communication interface, wherein the database is a remote central database and the processor can be further configured to transmit the extended display identification data to the central database as an index and retrieve the input lag data for the sink device via the communication interface.

In one embodiment, the signal may be a perceptible signal.

The signal can comprise an image having minimal compression latency and transmission bandwidth, such as a black square on a white background, a QR code or a series of color bands.

The source device can further include an input device and a display, and the processor can be configured to detect the signal reproduced at the sink device and measure the input lag by i) generating at least one more image at the display, ii) measuring a delay (d1) between generation of the image at the display and activation of the input device, iii) reproducing the image at the sink device, iv) measuring a delay (d2) between reproduction of the image at the sink device and activation of the input device, and v) subtracting d1 from d2 to estimate the input lag.

The processor can be configured to repeat i) generating the image at the display and ii) measure the delay (d1) multiple times, and average d1 to reduce variations therein.

The signal can comprise a sound and the source device can further include a microphone, wherein the processor can be configured to generate the sound and measure a time delay (d) between generation of the sound and detection of the sound reproduced at the sink device via the microphone. The estimation of input lag can also be configured to take into account the processing delay of sound detection (capture) at the source device.

The image can comprise a graphical representation of a timer and the source device can further include a camera, wherein the processor can be configured to detect the signal reproduced at the sink device and measure the input lag by i) generating the graphical representation of the timer, ii) reproducing the graphical representation of the timer at the sink device, iii) measuring a delay (d) between the time indicated by the graphical representation of the timer and the time as reproduced by the graphical representation of the timer at the sink device to estimate the input lag.

The estimation of input lag can also be configured to take into account the processing delay of sound detection (capture) at the source device.

Another aspect of the specification provides a method of estimating input lag of audio/video data transmitted from a source device to a sink device, comprising identifying manufacturer and model of the sink device; and retrieving input lag data for the sink device from a database indexed by manufacturer and model of the sink device.

The manufacturer and model of the sink device can be identified by reading extended display identification data from the sink device.

The manufacturer and model of the sink device can be identified by receiving data input thereof via an input device.

The method can further include transmitting the extended display identification data to a central database as an index and retrieving the input lag data for the sink device from the central database.

An additional aspect of the specification provides a method of estimating input lag of audio/video data transmitted from a source device to a sink device, comprising generating a signal at the source device; detecting the signal reproduced at the sink device; and measuring input lag between generation of the signal and reproduction thereof at the sink device.

The signal can comprise an image having minimal compression latency and transmission bandwidth, such as a black square on a white background.

The method can further include generating the image at a display on the source device, measuring a delay (d1) between generation of the image at the display and activation of an input device, reproducing the image at the sink device, measuring a delay (d2) between reproduction of the image at the sink device and activation of the input device, and subtracting d1 from d2 to estimate the input lag.

The method can further include repeatedly generating the image at the display and measuring the delay (d1), and averaging d1 to reduce variations therein.

The signal can comprise a sound and the method can further include generating the sound and measure a time delay (d) between generation of the sound and detection of the sound reproduced at the sink device.

The image can comprise a graphical representation of a timer, and the method can further include generating the graphical representation of the timer at the source device, reproducing the graphical representation of the timer at the sink device, measuring a delay (d) between the time indicated by the graphical representation of the timer at the source device and the time as reproduced by the graphical representation of the timer at the sink device to estimate the input lag.

Figure 1A:
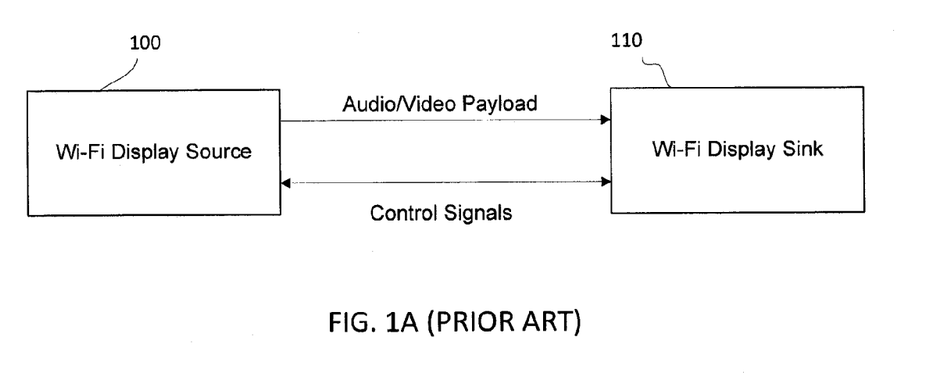
FIG. 1A is a block diagram showing a peer-to-peer wireless technology for securely and wirelessly sending video and audio from a source device to a sink device, according to the prior art.

FIG. 1A depicts a peer-to-peer wireless technology for securely and wirelessly sending video and audio from a source device 100 to a sink device 110, according to the prior art. Wi-Fi display source device 100 may comprise a mobile handheld device, electronic gaming device, laptop or tablet computer, or other device having the capability to exchange data over a wireless local area network (WLAN) using the Institute of Electrical and Electronics Engineers' (IEEE) 802.11 or similar standards or proprietary protocols. Wi-Fi display sink device 110 may comprise a display that incorporates a decoder and a Wi-Fi adapter, as shown in FIG. 1B, or may comprise a decoder and a Wi-Fi adapter that are connected to a conventional display 120, as shown in FIG. 1C.

Figure 1B:
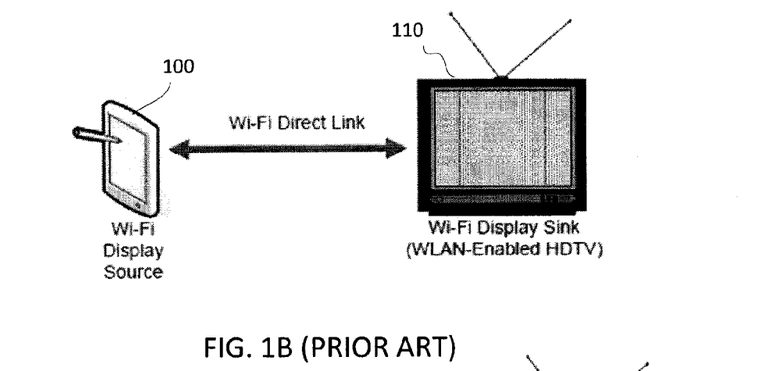
FIG. 1B is a schematic illustration of the peer-to-peer wireless technology of FIG. 1A where the Wi-Fi display sink device comprises a display that incorporates a decoder and a Wi-Fi adapter.
Figure 1C:
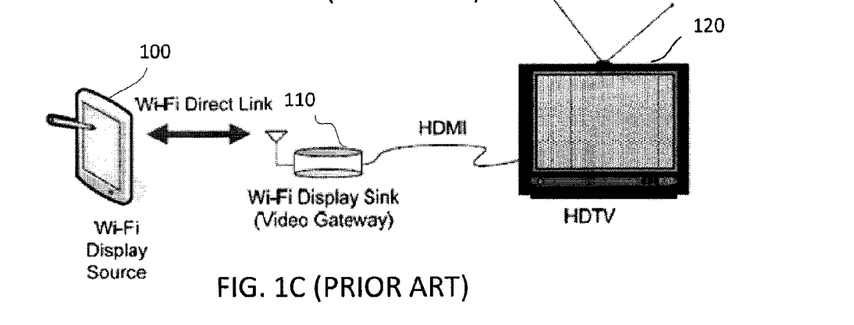
FIG. 1C is a schematic illustration of the peer-to-peer wireless technology of FIG. 1A where the Wi-Fi display sink device comprises a decoder and a Wi-Fi adapter that are connected to a conventional display.

In the embodiment of FIGS. 1A-1C, the source device 100 and sink device 110 communicate via the Wi-Fi Direct communication standard to deliver an audio/video payload from the source device to the sink device. According to the Wi-Fi Direct standard, Wi-Fi Protected Setup (WPS) is used to negotiate and establish a link between source device 100 and sink device 110 via the exchange of control signals. Setup generally consists of bringing the source and sink devices into proximity with each other and then triggering a "pairing" between them, using a button on one of the devices, or using near field communication (NFC). The audio and video content on the source device 100 is then packetized using Moving Picture Experts Group 2 Transport Stream (MPEG2-TS) coding and encapsulated by Real-Time Protocol (RTP) User Datagram Protocol (UDP) and Internet Protocol (IP). Finally, IEEE 802.11 packetization enables the source device 100 to send the content payload to the sink device 110. Additionally, user input may be transmitted from source device 100 to control sink device 110 via a User Interface Back Channel (UIBC).

As discussed above, transmission parameters may be adapted on the basis of channel conditions, such as input lag. Adaptation can be achieved by: compression ratio change and macroblock skipping (using the x264 standard), and encoder latency can be adjusted by varying the number of frames in the x264 internal buffer.

Figure 2:
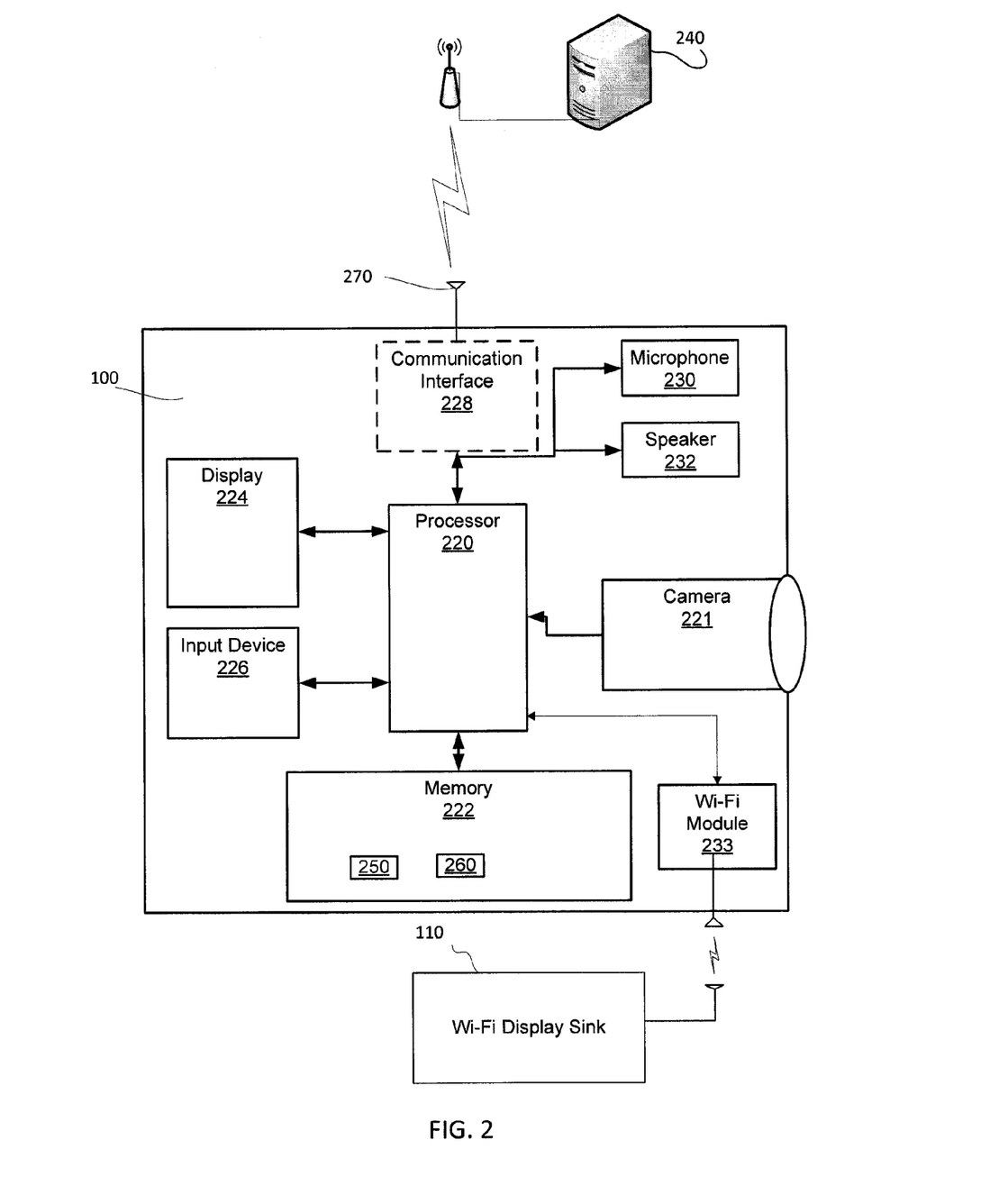
FIG. 2 is a block-schematic diagram of the peer-to-peer wireless technology of FIG. 1 with input lag estimation functionality, and optional communication with a central database, according to non-limiting implementations.

FIG. 2 depicts source device 100 according to non-limiting implementations, comprising: a processor 220 connected to a camera 221, a memory 222, a display 224, an input device 226, a microphone 230, a speaker 232, optional communication interface 228 and Wi-Fi module 233, which is configured to operate in accordance with the Miracast™ standard for streaming audio and video to the sink device 110. In one of the implementations depicted in FIG. 2, source device 100 is capable of communicating via optional communication interface 228 with a remote central database 240, either wirelessly (as shown) or via a wired connection such as the Internet (not shown).

Source device 100 can be any type of mobile electronic device that can be used to stream audio and video over a Wi-Fi link, including but not limited to, any combination of digital cameras, personal computers, laptop computers, mobile computing devices, portable computing devices, tablet computing devices, laptop computing devices, desktop phones, telephones, PDAs (personal digital assistants), cellphones, smartphones, e-readers, gaming devices, internet-configured appliances and the like.

A person of skill in the art will understand that FIG. 2 depicts a schematic diagram of source device 100 according to non-limiting implementations. It should be emphasized that the structure of source device 100 in FIG. 2 is purely an example of a device having functionality to estimate input lag, as described in further detail below, but may also be used for wireless voice (e.g. telephony) and wireless data communications (e.g. email, web browsing, text, and the like), as well as other suitable specialized functions, including but not limited to one or more of camera functionality, telephony, computing, appliance, and/or entertainment related functions.

Source device 100 comprises at least one input device 226 generally configured to receive input data, and can comprise any suitable combination of input devices, including but not limited to a keyboard, a keypad, a pointing device, a mouse, a track wheel, a trackball, a touchpad, a touch screen and the like. Other suitable input devices are within the scope of present implementations.

Input from input device 226 is received at processor 220 (which can be implemented as a plurality of processors, including but not limited to one or more central processors (CPUs)). Processor 220 is configured to communicate with memory 222 comprising a non-volatile storage unit (e.g. Erasable Electronic Programmable Read Only Memory ("EEPROM"), Flash Memory) and a volatile storage unit (e.g. random access memory ("RAM")). Programming instructions that implement the functionality of device 201 as described herein are typically maintained, persistently, in memory 222 and used by processor 220, which makes appropriate utilization of volatile storage during the execution of such programming instructions. Those skilled in the art will recognize that memory 222 is an example of computer readable media that can store programming instructions executable on processor 220. Furthermore, memory 222 is also an example of a memory unit and/or memory module.

In particular, memory 222 stores at least one application 250 that, when processed by processor 220, enables processor 220 to estimate input lag between source device 100 and sink device 110. In order to stream audio and video from source device 100 to sink device 110, memory 222 also stores at least one application 260 that, when processed by processor 220, encodes the audio/video payload according to the Miracast™ specification.

Processor 220 can also be configured to communicate with display 224, microphone 230 and speaker 232. Display 224 comprises any suitable one of or combination of CRT (cathode ray tube) and/or flat panel displays (e.g. LCD (liquid crystal display), plasma, OLED (organic light emitting diode), capacitive or resistive touch screens, and the like). When display 224 comprises a touch screen, it is appreciated that display 224 and input device 226 can be combined into one apparatus. Microphone 230 is configured to receive sound, and speaker 232 is configured to audibly produce sound, audible alerts, audible communications, and the like. In some implementations, input device 226 and display 224 are external to source device 100, with processor 220 in communication with each of input device 226 and display 224 via a suitable connection and/or link.

In optional implementations, as depicted, processor 220 also connects to communication interface 228, which is implemented as one or more radios and/or connectors and/or network adaptors, configured to wirelessly communicate with central database 240 via one or more communication networks. It will be appreciated that, in these implementations, communication interface 228 can be configured to correspond with the network architecture that is used to implement one or more communication links to the one or more communication networks, including but not limited to any suitable combination of USB (universal serial bus) cables, serial cables, wireless links, cell-phone links, cellular network links (including but not limited to 2G, 2.5G, 3G, 4G+, UMTS (Universal Mobile Telecommunications System), CDMA (Code division multiple access), WCDMA (Wideband CDMA), FDD (frequency division duplexing), TDD (time division duplexing), TDD-LTE (TDD-Long Term Evolution), TD-SCDMA (Time Division Synchronous Code Division Multiple Access) and the like, wireless data, BluetoothiM links, NFC (near field communication) links, Wi-Fi links, WiMax links, packet based links, the Internet, analog networks, the PSTN (public switched telephone network), access points, and the like, and/or a combination. When communication interface 228 is configured to communicate with one or more communication networks, communication interface 228 can comprise further protocol specific antennas, such as antenna 270.

While not depicted, it is further appreciated that source device 100 further comprises one or more power sources, including but not limited to a battery and/or a connection to an external power source, including, but not limited to, a main power supply.

In any event, it should be understood that in general a wide variety of configurations for source device 100 are contemplated.

Figure 3:
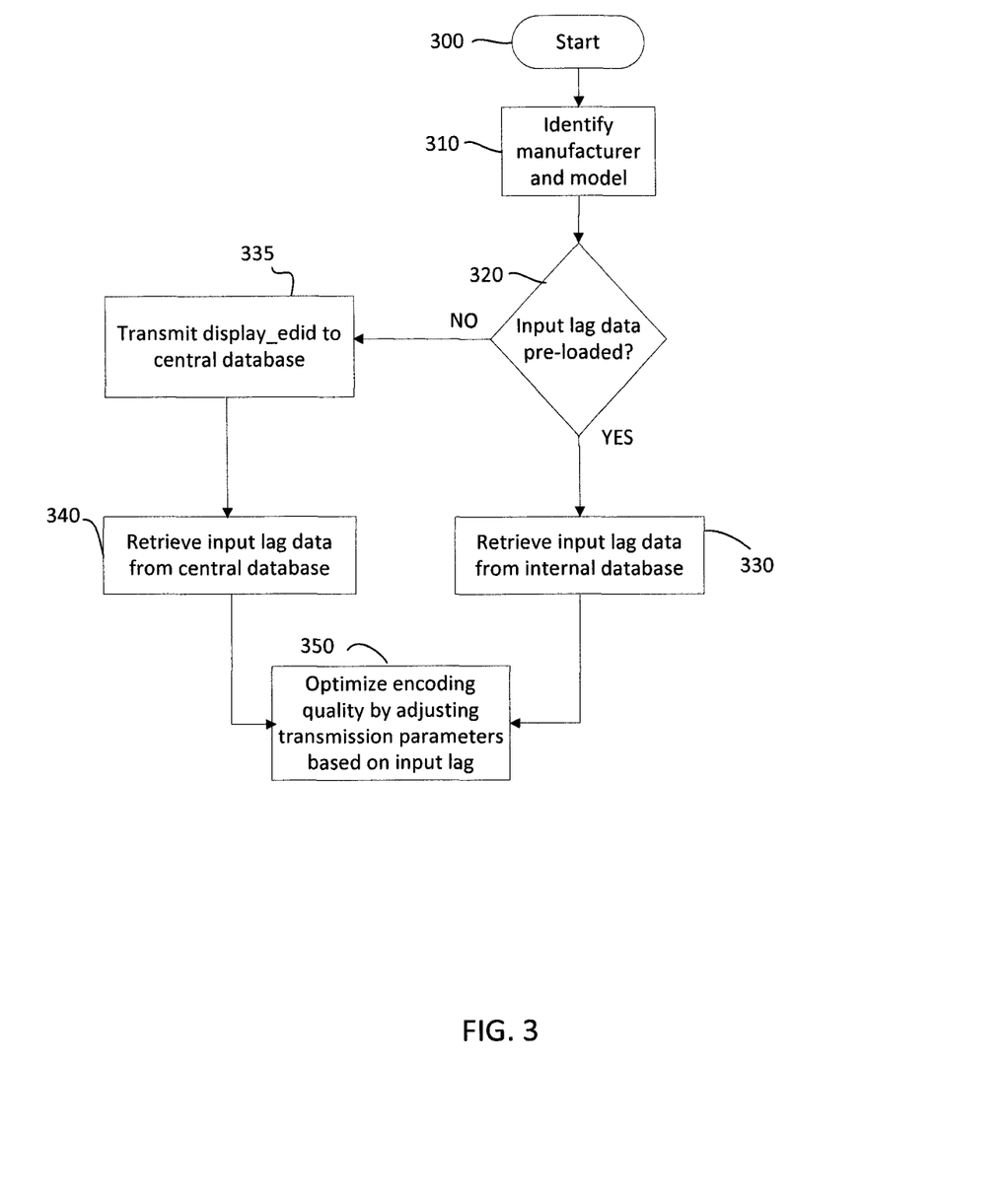
FIG. 3 is a flowchart of a method of estimating input lag using the technology of FIG. 2, according to non-limiting embodiments.

As will be explained in further detail below, memory 222 stores an input lag estimation application 250 which, when processed by processor 220, enables source device 100 to estimate the input lag between source device 100 and sink device 110. In one embodiment, as shown in FIG. 3, the input lag is estimated based on information relating to the manufacturer and model of the source device 100. In another embodiment, as shown in FIG. 4, the input lag is estimated based on a measurement of time delay between perceptible outputs at the source device 100 and sink device 110.

According to the embodiment shown in FIG. 3, application 250 starts at 300 and, at 310, the manufacturer and model of sink device 110 are identified. According to one embodiment, the source device 100 reads the display_edid message generated by sink device 110 for identifying manufacturer and model of sink device 110. In another embodiment, the manufacturer and model of sink device 110 are entered into source device 100 via input device 226. In some embodiments, the input lag information is pre-loaded as a table into memory 222 of source device 100, in which case the display_edid message is used as at 330 as an index for locating the associated input lag. If the source device has not been pre-loaded with input lag data (i.e. a NO branch from 320), then the display_edid message is transmitted via communication interface 228, at 335, to central database 240, which contains the input lag information. The display_edid message is used within database 240 as an index for locating the associated input lag, which is then retrieved by source device 100 from database 240 at 340, using communication interface 228. Then, at 350, the encoding of the audio/video payload, by application 260, is optimized using the input lag estimated by application 250 in order to adjust transmission parameters, as discussed above.

Figure 4:
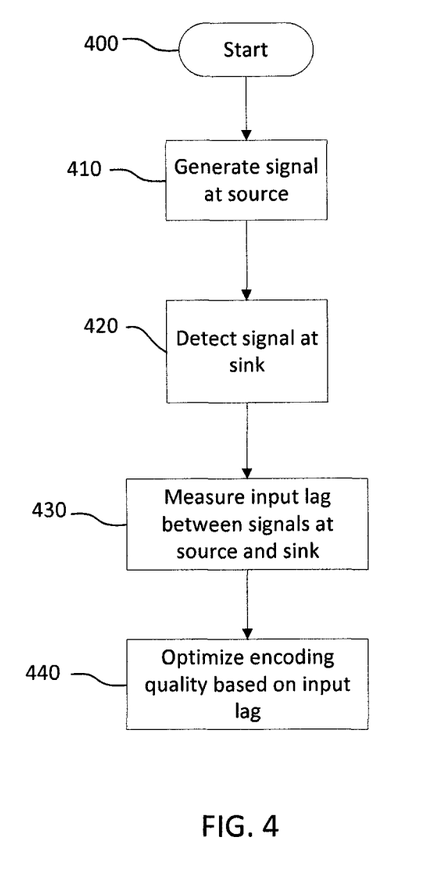
FIG. 4 is a flowchart of a method of estimating input lag using the technology of FIG. 2, according to further non-limiting embodiments.

In some implementations, where the display_edid message is not available, input lag may be estimated using calibration techniques, as set forth in FIG. 4, where the application 250 starts at 400 and then, at 410, generates a signal at source device 100; followed at 420 by detection of the resulting signal reproduced at sink device 110; measurement, at 430, of the input lag between the signals at the source device 100 and sink device 110; and, at 440, optimizing encoding of the audio/video payload by application 260 using the input lag estimated by application 250 in order to adjust transmission parameters as discussed above.

Figure 5A:
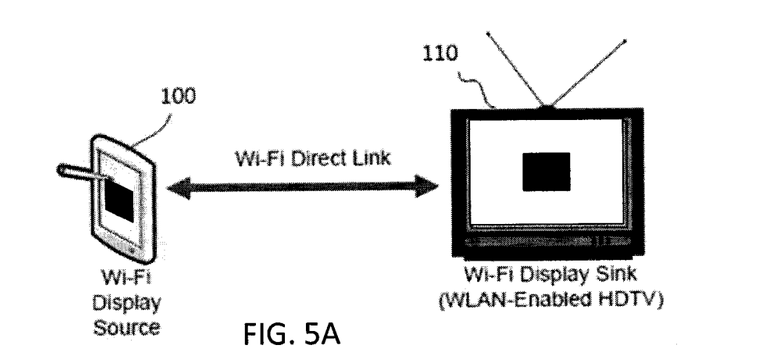
FIGS. 5A and 5B are schematic illustrations of perceptible images generated according to the method depicted in FIG. 4.

In one embodiment, the signal is a simple image. For example, a simple image may be generated at 410 via display 224. The image may, for example, be a black square on white background, as shown in FIG. 5A, or other image having minimal compression latency and transmission bandwidth (e.g. a QR code or a series of color bands). In response to generation of the image, a user activates input device 226 and the time delay (d1)) between generation of the image and activation of the input device is measured. The procedure of measuring the delay between generating the image and detecting the input may be repeated multiple times and d1 may be averaged to reduce the impact of variations in user reaction time. The image is streamed to the sink device 110 in the usual manner and, at 420, in response to generation of the image at the sink device, the user activates input device 226 and the time delay (d2) between generation of the image at sink device 110 and activation of the input device is measured. The delay d2 includes the time it takes application 260 to encode the image, the time it takes to transmit the image from source device 100 to sink device 110, the input lag, and the user response delay; the user response delay may be removed by subtracting d1 from d2, such that the remainder (d2-d1-encoding, transmission and capture processing times) represents an accurate estimate of the input lag at the sink device 110.

In another embodiment, the signal is a discrete sound. For example, a simple 'ping' sound may be generated at 410 via speaker 232. The audio is streamed to the sink device 110 in the usual manner and, at 420, in response to reproduction of the sound at the sink device the sound is detected by microphone 230 at the source device 100. The time delay (d) between generation of the sound at sink device 110 and detection at the source device 100 is measured at 430. The delay d includes the time it takes application 260 to encode the audio, the time it takes to transmit the audio from source device 100 to sink device 110, the input lag, the processing delay of sound detection (capture) at the input device 226, and the time for the audio to be transmitted from sink device 110 to source device 100 for detection by microphone 230. Provided the source device 100 and sink device 110 are located in close proximity to one another, the time for the audio to be transmitted from sink device 110 to source device 100 may be assumed to be negligible and the encoding and transmission times are calculable as is the processing delay of sound detection (capture), and may be subtracted from d, such that the remainder represents an accurate estimate of the input lag at the sink device 110.

Figure 5B:
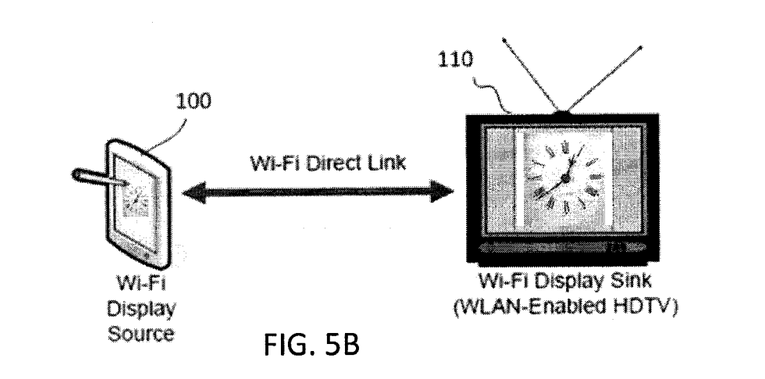

In another embodiment, the signal is a graphical representation of a timer, as shown in FIG. 5B. The video image of the timer is generated by application 250 on the display 224, and streamed to the sink device 110 in the usual manner. At 420, in response to reproduction of the timer image at the sink device 110, camera 221 captures the image at source device 100 and the input lag between the time appearing at the sink device 110 and the time appearing on the display 224 is measured at 430.

In yet another embodiment, the camera 221 may be pointed at the sink device 110 and the input device 226 activated to trigger the source device 100 to begin synchronization with the sink device 110. The source device 100 then transmits at least one simple image that requires minimal encoding and compression, and source device 100 then measures d1 (the time of the transmission of the image) and d2 (the time when the image appearing on the screen of the sink device 110 is detected using the camera 221). In practice, the manufacturer of the source device 100 can also subtract the further delay that is measured between the time of display and the time of capture on the camera 221.

Those skilled in the art will appreciate that in some implementations, the functionality of source device 100 can be implemented using pre-programmed hardware or firmware elements (e.g., application specific integrated circuits (ASICs), electrically erasable programmable read-only memories (EEPROMs), etc.), or other related components. In other implementations, the functionality of source device 100 can be achieved using a computing apparatus that has access to a code memory (not shown) which stores computer-readable program code for operation of the computing apparatus. The computer-readable program code could be stored on a computer readable storage medium which is fixed, tangible and readable directly by these components, (e.g., removable diskette, CD-ROM, ROM, fixed disk, USB drive). Furthermore, it is appreciated that the computer-readable program can be stored as a computer program product comprising a computer usable medium. Further, a persistent storage device can comprise the computer readable program code. It is yet further appreciated that the computer-readable program code and/or computer usable medium can comprise a non-transitory computer-readable program code and/or non-transitory computer usable medium. Alternatively, the computer-readable program code could be stored remotely but transmittable to these components via a modem or other interface device connected to a network (including, without limitation, the Internet) over a transmission medium. The transmission medium can be either a non-mobile medium (e.g., optical and/or digital and/or analog communications lines) or a mobile medium (e.g., microwave, infrared, free-space optical or other transmission schemes) or a combination thereof.

Persons skilled in the art will appreciate that there are yet more alternative implementations and modifications possible, and that the above examples are only illustrations of one or more implementations. The scope, therefore, is only to be limited by the claims appended hereto.

What is claimed is:

1. A method of estimating input lag of audio/video data transmitted from a source device to a sink device, comprising:
    generating an image at the source device and rendering the image on a display of the source device;
    receiving, at the source device, a first input from an input device of the source device;
    measuring, at the source device, a delay (d1) between the rendering the image on the display of the source device and the receiving of the first input;
    transmitting the image from the source device to the sink device for reproduction on a display of the sink device;
    detecting, at the source device, reproduction of the image on the display of the sink device;
    receiving, at the source device, a second input from the input device;
    measuring, at the source device, a delay (d2) between the detecting reproduction of the image on the display of the sink device and the receiving of the second input; and,
    estimating the input lag by subtracting d1 from d2.

2. The method of claim 1, wherein the image comprises a black square on a white background, a quick response (QR) code, or a series of colour bands.

3. The method of claim 1, further including repeatedly generating, at the source device, the image, rendering the image on the display of the source device, and measuring, at the source device, the delay (d1), and averaging the d1's that are measured.

4. The method of claim 1, further comprising:
    generating, at the source device, a signal comprising a sound.

5. The method of claim 4, further comprising:
    transmitting, from the source device to the sink device, the signal for reproduction of the sound at the sink device;
    in response to detection, at a microphone of the source device, of the sound reproduced at the sink device, measuring, at the source device, a time delay (d) between the generating of the sound and the detection of the sound reproduced at the sink device.

6. The method of claim 1, further comprising:
    generating, at the source device, a video image, the video image comprising a graphical representation of a timer and rendering the video image on the display of the source device.

7. The method of claim 6, further comprising:
    detecting, at the source device, reproduction of the video image comprising the graphical representation of the timer on the display of the sink device; and,
    estimate a further input lag by measuring a delay (d) between a time indicated the video image comprising the graphical representation of the timer is rendered on the display of the source device and a time reproduction of the video image comprising the graphical representation of the timer on the display of the sink device is detected.

8. A source device comprising:
    a display;
    an input device;
    a Wi-Fi module configured to communicate with a Wi-Fi module of a sink device;
    a processor operably coupled to the input device, the display, and the Wi-Fi module, the processor configured to:
        generate an image and render the image on the display;
        receive a first input from the input device;
        measure a delay (d1) between the rendering the image on the display and the receipt of the first input;
        transmit, via the Wi-Fi module, the image to the sink device for reproduction on a display of the sink device;
        detect reproduction of the image on the display of the sink device;
        receive a second input from the input device;
        measure delay (d2) between the detecting reproduction of the image on the display of the sink device and the receipt of the second input; and,
        estimate an input lag for transmitting the image by subtracting d1 from d2.

9. The source device of claim 8, wherein the image comprising a black square on a white background, a quick response (QR) code, or a series of colour bands.

10. The source device of claim 8, wherein the processor is further configured to repeatedly generate the image, render the image on the display, and measure the delay (d1), and average the d1's that are measured.

11. The source device of claim 8, wherein the processor is further configured to:
    generate a signal comprising a sound.

12. The source device of claim 11, wherein the processor is further configured to:
    transmit the signal to the sink device for reproduction of the sound at the sink device; and,
    in response to detection, at a microphone of the source device, of the sound reproduced at the sink device, measure a time delay (d) between the generation of the sound and the detection of the sound reproduced at the sink device.

13. The source device of claim 8, wherein the processor is further configured to:
    generate a video image, the video image comprising a graphical representation of a timer and rendering the video image on the display of the source device.

14. The source device of claim 13, wherein the processor is further configured to:
    detect reproduction of the video image comprising the graphical representation of the timer on the display of the sink device; and,
    estimate a further input lag by measuring a delay (d) between a time indicated the video image comprising the graphical representation of the timer is rendered on the display of the source device and a time the video image comprising the graphical representation of the timer on the display of the sink device is detected.

* * * * *